US012798573B2

(12) United States Patent
Wang

(10) Patent No.: US 12,798,573 B2
(45) Date of Patent: Nov. 17, 2026

(54) VEHICLE, AUTOMATED LANE KEEPING SYSTEM, AND AUTOMATED LANE KEEPING METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 19/072,319

(22) Filed: Mar. 6, 2025

(65) Prior Publication Data

US 2025/0289424 A1 Sep. 18, 2025

(30) Foreign Application Priority Data

Mar. 13, 2024 (CN) ........................ 202410285304.0

(51) Int. Cl.

| | |
|---|---|
| ***B60W 30/12*** | (2020.01) |
| ***B60W 30/182*** | (2020.01) |
| ***B60W 50/14*** | (2020.01) |

(52) U.S. Cl.

CPC .......... *B60W 30/12* (2013.01); *B60W 30/182* (2013.01); *B60W 50/14* (2013.01); (Continued)

(58) Field of Classification Search

CPC .... B60W 30/12; B60W 30/182; B60W 50/14; B60W 2050/146; B60W 2420/403; (Continued)

(56) References Cited

U.S. PATENT DOCUMENTS

| | | | |
|---|---|---|---|
| 6,173,222 B1 | 1/2001 | Seo et al. | |
| 9,988,048 B1 | 6/2018 | Song et al. | |

(Continued)

FOREIGN PATENT DOCUMENTS

| | | | |
|---|---|---|---|
| CN | 209099252 U * | 7/2019 | |
| CN | 111522246 A * | 8/2020 | G05B 15/02 |

(Continued)

OTHER PUBLICATIONS

Jul. 8, 2025 European Search Report issued in corresponding EP Application No. 25162637.

*Primary Examiner* — Joseph J Dallo
(74) *Attorney, Agent, or Firm* — Clements Bernard Walker; Christopher L. Bernard

(57) ABSTRACT

An automated lane keeping system for a vehicle, including first, second, and third environmental sensors; a processing unit including first and second processors each of which is electrically connected to the first to third environmental sensors; and a control unit configured to: determine an availability condition for an asymmetric mode of an automated lane keeping function is met; if it is determined that the availability condition for the asymmetric mode is met, control the sensor unit and the processing unit to switch the automated lane keeping function to the asymmetric mode from a default mode. In the default mode, the second processor receives and processes the first sensor data, while the first processor receives and processes the second and third sensor data; in the asymmetric mode, the first and second processors respectively receive and process the second and third sensor data.

20 Claims, 4 Drawing Sheets

(52) U.S. Cl.
CPC . *B60W 2050/146* (2013.01); *B60W 2420/403* (2013.01); *B60W 2420/408* (2024.01); *B60W 2552/53* (2020.02); *B60W 2556/20* (2020.02); *B60W 2556/35* (2020.02); *B60W 2556/45* (2020.02)

(58) Field of Classification Search
CPC ....... B60W 2420/408; B60W 2552/53; B60W 2556/20; B60W 2556/35; B60W 2556/45; B60W 50/023; B60W 50/082; B60W 60/0053; B60W 2050/0005; B60W 2556/50; B60W 50/045
See application file for complete search history.

(56) References Cited

U.S. PATENT DOCUMENTS

| | | | | |
|---|---|---|---|---|
| 2019/0232955 | A1* | 8/2019 | Grimm | G06N 3/08 |
| 2021/0354634 | A1* | 11/2021 | Yoon | G01S 13/867 |

FOREIGN PATENT DOCUMENTS

| | | | | |
|---|---|---|---|---|
| EP | 2930081 | A1 | 10/2015 | |
| WO | WO-2022104925 | A1 * | 5/2022 | B60W 40/00 |
| WO | 2022214148 | A1 | 10/2022 | |
| WO | WO-2023060049 | A1 * | 4/2023 | G06V 40/19 |

* cited by examiner

VEHICLE, AUTOMATED LANE KEEPING SYSTEM, AND AUTOMATED LANE KEEPING METHOD

CROSS-REFERENCE TO RELATED APPLICATION

The present disclosure claims the benefit of priority of co-pending Chinese Patent Application No. CN 202410285304.0, filed on Mar. 13, 2024, and entitled "Vehicle, Automated Lane Keeping System, and Automated Lane Keeping Method," the contents of which are incorporated in full by reference herein.

TECHNICAL FIELD

The present disclosure generally relates to the technical field of vehicle control. More specifically, the disclosure relates to systems and methods for automated lane keeping.

BACKGROUND

Currently, various driving assistance or autonomous driving functions have been implemented in vehicles. Among these, the automated lane keeping system (ALKS), as defined by United Nations Regulation UN-R157, has garnered significant attention from both the industry and users due to its ability to help drivers keep the vehicle within the lane, thereby significantly reducing accidents caused by driver distraction or fatigue. However, existing automated lane keeping systems require extensive redundant calculations to ensure the safety of decisions made by the ALKS function, which typically demands high computational power from chips processing sensor data from multiple environmental perception sensors. As a result, existing automated lane keeping systems are costly.

SUMMARY

In this context, the present disclosure aims to provide an automated lane keeping solution capable of operating the automated lane keeping function in an asymmetric mode. This approach enables redundant calculations of sensor data without increasing the computational resources required for processing the sensor data, thereby achieving optimization in both performance and cost.

According to an embodiment of the present disclosure, an automated lane keeping system for a vehicle is provided. The system includes a sensor unit including first, second, and third environmental sensors, the first environmental sensor being arranged on one side of a vehicle body of the vehicle and configured to sense a surrounding environment of said one side of the vehicle body and output first sensor data, the second environmental sensor being arranged on the other side of the vehicle body and configured to sense a surrounding environment of the other side of the vehicle body and output second sensor data, the third environmental sensor being arranged at the front of the vehicle body and configured to sense a surrounding environment in front of the vehicle body and output third sensor data; a processing unit including first and second processors each of which is electrically connected to the first to third environmental sensors via a wire; and a control unit communicatively connected to the sensor unit and the processing unit, and configured to determine whether the current vehicle state and driving scenario meet an availability condition for an asymmetric mode of an automated lane keeping function; if it is determined that the availability condition for the asymmetric mode is met, control the sensor unit and the processing unit to switch the automated lane keeping function to the asymmetric mode from a default mode, wherein, in the default mode, the second processor receives and processes the first sensor data, while the first processor receives and processes the second and third sensor data; in the asymmetric mode, the first and second processors respectively receive and process the second and third sensor data.

In an example, the control unit is further configured to: verify the timeliness and integrity of data transmission and the accuracy of perception results in the asymmetric mode; if all the verifications of timeliness, integrity, and accuracy pass, maintain the asymmetric mode; and if at least one of the verifications of timeliness, integrity, and accuracy fails, control the sensor unit and the processing unit to switch the automated lane keeping function to the default mode.

In an example, verifying the timeliness of data transmission includes: determining whether a time interval between the moment the second processor receives the third sensor data and the moment the first processor receives the third sensor data is less than a first predetermined time interval; determining whether a time interval between the moment the first processor receives the second sensor data and the moment the second processor receives the second sensor data is less than a second predetermined time interval; judging that the timeliness verification passes if both determinations are affirmative; and judging that the timeliness verification fails if at least one determination is negative.

In an example, verifying the integrity of data transmission includes: determining whether the number of data frames received by the first processor within a predetermined duration is equal to the number of data frames received by the second processor within the same predetermined duration; judging that the integrity verification passes if the determination is affirmative; and judging that the integrity verification fails if the determination is negative.

In an example, verifying the accuracy of perception results includes: determining consistency between a first perception result obtained by the first processor processing sensor data using a first algorithm and a second perception result obtained by the second processor processing sensor data using a second algorithm, wherein the second algorithm is different from the first algorithm; judging that the accuracy verification passes if the first and second perception results are consistent; and judging that the accuracy verification fails if the first and second perception results are inconsistent.

In an example, verifying the accuracy of perception results includes: obtaining a perception result of detected objects generated by the first processor, which processes the second and third sensor data using a first algorithm, and another perception result of the drivable space generated by the second processor, which processes the second and third sensor data using a second algorithm, determining whether the two perception results are consistent by checking whether the detected objects are located outside the drivable space; if the checking result indicates that all detected objects are located outside the drivable space, determines that the two perception results are consistent and that the accuracy verification passes; and if the checking result indicates that at least one detected object is located inside the drivable space, determining that the two perception results are inconsistent and that the accuracy verification fails.

In an example, verifying the accuracy of perception results includes: obtaining a perception result of detected objects generated by the first processor, which processes the second and third sensor data using a first algorithm, and another perception result of the drivable space generated by the second processor, which processes the second and third sensor data using a second algorithm; calculating a confidence level based on the extent to which the detected objects fall within the drivable space; if the confidence level is greater than or equal to a confidence threshold, determining that the accuracy verification passes; and if the confidence level is less than the confidence threshold, determining that the accuracy verification fails.

In an example, the control unit is configured to, in the asymmetric mode, control the first processor to process the second and third sensor data using a first predetermined algorithm to generate a first environmental perception result; control the second processor to process the second and third sensor data using the first predetermined algorithm to generate a second environmental perception result; compare the first environmental perception result with the second environmental perception result to obtain a first matching degree; maintain the automated lane keeping function in the asymmetric mode if the first matching degree is greater than a matching degree threshold; and control the automated lane keeping function to return to the default mode if the first matching degree is equal to or less than the matching degree threshold.

In an example, the control unit is configured to, in asymmetric mode, control the first processor to process the second and third sensor data using a first predetermined algorithm to generate a first environmental perception result; control the second processor to process the second and third sensor data using the first predetermined algorithm to generate a second environmental perception result; compare the first environmental perception result with the second environmental perception result to obtain a first matching degree; request environmental information sensed by other vehicles and/or roadside facilities; process the environmental information using a second predetermined algorithm to generate a third environmental perception result; compare the third environmental perception result with the first environmental perception result to obtain a second matching degree; compare the third environmental perception result with the second environmental perception result to obtain a third matching degree; maintain the automated lane keeping function in the asymmetric mode if each of the first, second, and third matching degrees is greater than the matching degree threshold; and control the automated lane keeping function to return to the default mode if at least one of the first, second, and third matching degrees is equal to or less than the matching degree threshold.

In an example, the control unit is configured to, in asymmetric mode, control the first processor to process a first modality sensor data in the second and third sensor data using the first predetermined algorithm to generate the first environmental perception result; and control the second processor to process a second modality sensor data in the second and third sensor data using the first predetermined algorithm to generate the second environmental perception result.

In an example, the control unit is configured to increase the matching degree threshold in scenarios where lane markings are unclear or have been repainted or where the sensor perception distance is affected.

In an example, determining whether the availability condition is met includes determining whether the current vehicle position, the current lane in which the vehicle is traveling, and the capabilities of the second and third sensors to perceive lane lines of the current lane all met corresponding preset conditions.

In an example, determining whether the availability condition is met includes determining whether each of the following conditions is met: —the current vehicle position is within a predetermined area where the asymmetric mode is permitted; —the current lane where the vehicle is traveling is the outermost lane of a multi-lane road; —the lateral distance between a boundary line of the outermost lane and one side of the vehicle adjacent to that boundary line is less than a predetermined lateral distance threshold; and—both lane lines of the current lane within a longitudinal distance threshold ahead of the vehicle are clearly identifiable by the second and/or third environmental sensors.

In an example, the automated lane keeping system includes a human-machine interface (HMI) configured to provide a message indicating the availability status of the asymmetric mode.

In an example, the first processor and the second processor are deployed on separate in-vehicle chips; or the first processor and the second processor are deployed on different cores of a multi-core processor of a single in-vehicle chip.

In an example, the asymmetric mode is triggered by a request from a user of the vehicle to activate the asymmetric mode.

According to another embodiment of the present disclosure, a vehicle, which includes the automated lane keeping system described above, is provided.

According to yet another embodiment of the present disclosure, an automated lane keeping method for a vehicle is provided. The vehicle includes: a sensor unit including first, second, and third environmental sensors, the first environmental sensor being arranged on one side of a vehicle body of the vehicle and configured to sense a surrounding environment of said one side of the vehicle body and output first sensor data, the second environmental sensor being arranged on the other side of the vehicle body and configured to sense a surrounding environment of the other side of the vehicle body and output second sensor data, the third environmental sensor being arranged at the front of the vehicle body and configured to sense a surrounding environment in front of the vehicle body and output third sensor data; and a processing unit including first and second processors each of which is electrically connected to the first to third environmental sensors via a wire. The automated lane keeping method includes the step of determining whether the current vehicle state and driving scenario meet an availability condition for an asymmetric mode of an automated lane keeping function; if it is determined that the availability condition for the asymmetric mode is met, control the sensor unit and the processing unit to switch the automated lane keeping function to the asymmetric mode from a default mode, wherein, in the default mode, the second processor receives and processes the first sensor data, while the first processor receives and processes the second and third sensor data; in the asymmetric mode, the first and second processors respectively receive and process the second and third sensor data.

In an example, the automated lane keeping method includes the steps of: in the asymmetric mode, verifying the timeliness and integrity of data transmission and the accuracy of perception results; if all the verifications of timeliness, integrity, and accuracy pass, maintaining the asymmetric mode; and if at least one of the verifications of timeliness, integrity, and accuracy fails, controlling the sensor unit and the processing unit to switch the automated lane keeping function to the default mode.

According to yet another embodiment of the present disclosure, a machine-readable non-transitory storage medium stores executable instructions that, when executed, cause one or more processors to perform the method described above.

BRIEF DESCRIPTION OF THE DRAWINGS

The disclosed aspects will hereinafter be described in connection with the appended drawings that are provided to illustrate but not to limit the scope of the present disclosure.

DETAILED DESCRIPTION

Embodiments of the present disclosure will now be described in conjunction with the drawings.

Example Systems

Figure 1:
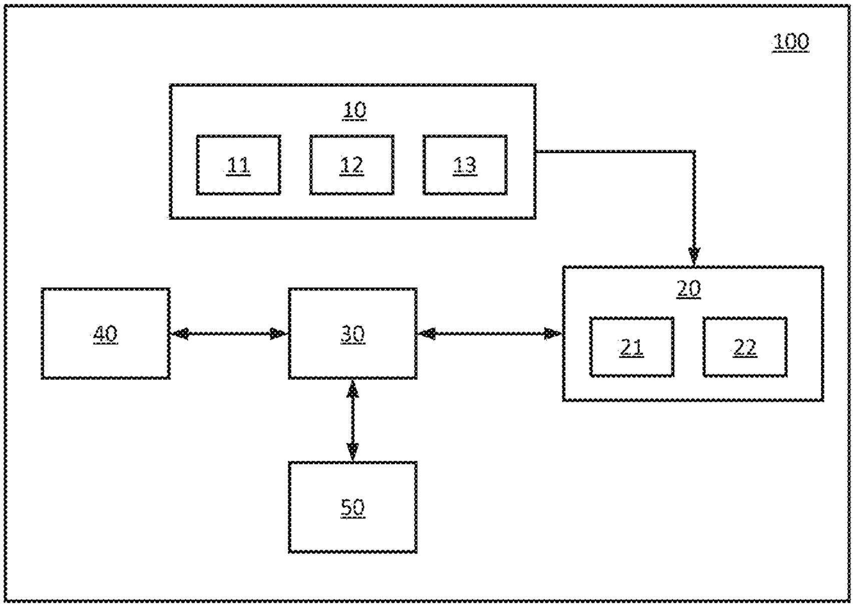
FIG. 1 is a schematic block diagram of an automated lane keeping system according to an embodiment of the present disclosure.

FIG. 1 illustrates an automated lane keeping system 100 according to an embodiment of the present disclosure. The automated lane keeping system is installed in a vehicle (200) and is thus an in-vehicle system. As shown in FIG. 1, the automated lane keeping system 100 includes a sensor unit 10, a processing unit 20, a control unit 30, a communication unit 40, and a human-machine interface (HMI) 50.

The sensor unit 10 includes a first environmental sensor 11 and a second environmental sensor 12. Both the first and second environmental sensors 11 and 12 are in-vehicle sensors. The first environmental sensor 11 is arranged on one side (200A) of the vehicle body (210) to sense the surrounding environment on that side (200A) and output first sensor data. The first sensor data includes environmental information about the surrounding environment on said one side (200A) of the vehicle body (210). The second environmental sensor 12 is arranged on the other side (200B) of the vehicle body (210) to sense the surrounding environment on that side (200B) and output second sensor data. The second sensor data includes environmental information about the surrounding environment on the other side (200B) of the vehicle body (210).

The first environmental sensor 11 can include multiple environmental sensors, which can include various types of environmental sensors (multi-mode sensors), such as cameras, radars, and lidars. Similarly, the second environmental sensor 12 can also include multiple environmental sensors, which can include various types of environmental sensors (multi-mode sensors), such as cameras, radars, and lidars.

The sensor unit 10 can further include a third environmental sensor 13. The third environmental sensor 13 is also an in-vehicle sensor. The third environmental sensor 13 is arranged at the front of the vehicle body (210) to sense the surrounding environment ahead of the vehicle and output third sensor data. The third sensor data include environmental information about the surrounding environment ahead of the vehicle body (210).

According to an embodiment of the present disclosure, one or both of the side sensors (i.e., the first environmental sensor 11 and the second environmental sensor 12) are selectively turned on or off depending on whether the automated lane keeping function is in the default mode or the asymmetric mode. The forward sensor (i.e., the third environmental sensor 13) remains on regardless of whether the automated lane keeping function is in the default mode or the asymmetric mode.

In an embodiment of the present disclosure, the processing unit 20 includes a first processor 21 and a second processor 22. The first processor 21 is arranged in a main chip, such as a main computing unit or main computing area. The second processor 22 is arranged in a secondary chip, such as a secondary computing unit or secondary computing area.

Figure 2A:
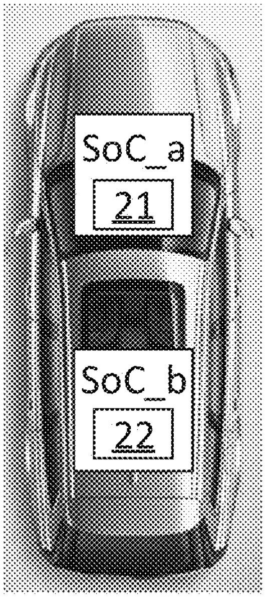
FIGS. 2A and 2B illustrate some embodiments of the processing unit of the automated lane keeping system shown in FIG. 1.
Figure 2B:
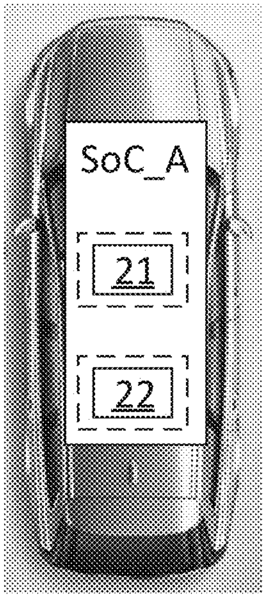

In an embodiment, referring to FIG. 2A, the first processor 21 and the second processor 22 are arranged on two different chips. For example, the first processor 21 is arranged on a first SoC of the vehicle (see SoC_a in FIG. 2A), and the second processor 22 is arranged on a second SoC of the vehicle (see SoC_b in FIG. 2A). In another embodiment, referring to FIG. 2B, the first processor 21 and the second processor 22 are arranged on the same chip (see SoC_A in FIG. 2B). This chip includes a multi-core processor with a safety isolation function (safety isolation design), and the first processor 21 and the second processor 22 are arranged in different cores of the multi-core processor.

Figure 3:
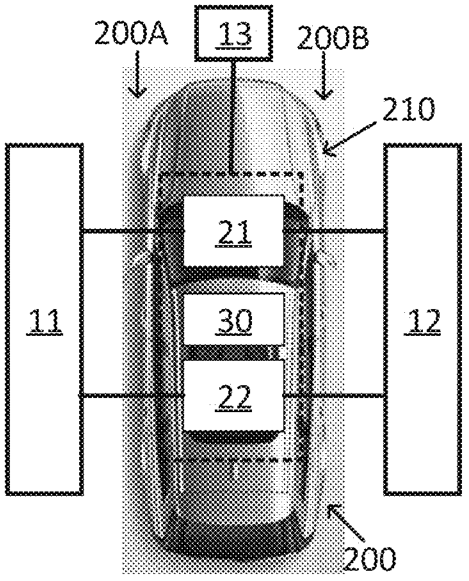
FIG. 3 shows the electrical connection between the sensor unit and the processing unit of the automated lane keeping system shown in FIG. 1.

FIG. 3 illustrates the electrical connection between the processing unit 20 and the sensor unit 10. As shown in FIG. 3, the first processor 21 is connected to each of the first, second and third environmental sensors 11-13 via a wire. For example, the first processor 21 has three interfaces, each of which is configured to connect with one of the first, second and third environmental sensors 11-13 via a wire. Similarly, the second processor 22 is connected to each of the first, second and third environmental sensors 11-13 via a wire. For example, the second processor 22 has three interfaces, each of which is configured to connect with one of the first, second and third environmental sensors 11-13 via a wire. It should be noted that, as shown in FIG. 3, there are electrical connections between each processor and each environmental sensor, but when the automated lane keeping function is operated in different modes, the transmission channels for sensor data, that is, the data flow direction, will be different. This will be explained in detail below.

The communication unit 40 is used to communicate with external devices outside the vehicle through wired and/or wireless communication. For example, the vehicle can interact with one or more of the following via the communication unit 40: a cloud server, a roadside facility, another vehicle, and a vehicle-to-network server.

The HMI 50 is used to facilitate interaction between the vehicle and the vehicle user. For example, the HMI 50 can display information related to the status or mode of the automated lane keeping function to the user. Additionally, the HMI 50 can receive user input, such as a request to activate the asymmetric mode of the automated lane keeping function.

The control unit 30 is communicatively connected to the processing unit 20, the communication unit 40, and the HMI 50. According to an embodiment of the present disclosure, the automated lane keeping function has two modes: a default mode and an asymmetric mode. The control unit 30 is configured to determine whether the automated lane keeping function operates in the default mode or the asymmetric mode based on information received from the processing unit 20 and the communication unit 40. It then outputs corresponding control commands to the processing unit 20 and the HMI 50.

For example, the control unit 30 controls the automated lane keeping function to switch from the default mode to the asymmetric mode, return from the asymmetric mode to the default mode, or maintain the default mode. Additionally, information regarding the status of the automated lane keeping function can be displayed on the HMI 50.

Figure 4A:
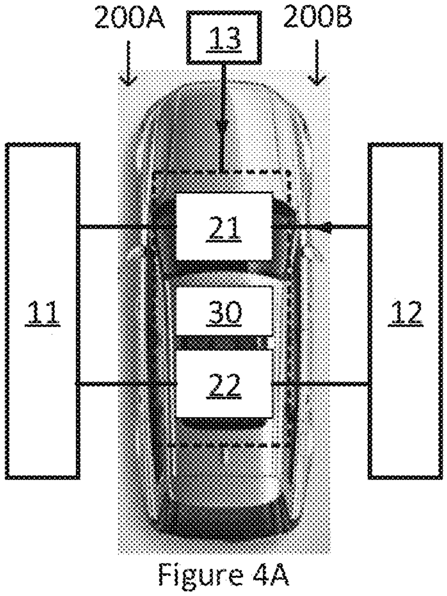
FIGS. 4A and 4B respectively illustrate the default mode and the asymmetric mode of the automated lane keeping function according to an embodiment of the present disclosure.

According to an embodiment of the present disclosure, referring to FIG. 4A, when the automated lane keeping system 100 is in the default mode, all of the first to third environmental sensors 11-13 are turned on. In the default mode, the first processor 21 receives second sensor data from the second environmental sensor 12 and third sensor data from the third environmental sensor 13 and processes the received sensor data. Additionally, the second processor 22 receives first sensor data from the first environmental sensor 11, processes the received sensor data, and transmits the processing result to the first processor 21. In other words, in the default mode, the flow of sensor data is as follows: the second and third sensor data go to the first processor 21, while the first sensor data go to the second processor 22. Subsequently, the control unit 30 makes a decision regarding the status of the automated lane keeping function based on the perception results (i.e., the results derived from the processing of the sensor data) from both the first processor 21 and the second processor 22 and then performs corresponding control actions based on the decision.

Figure 4B:
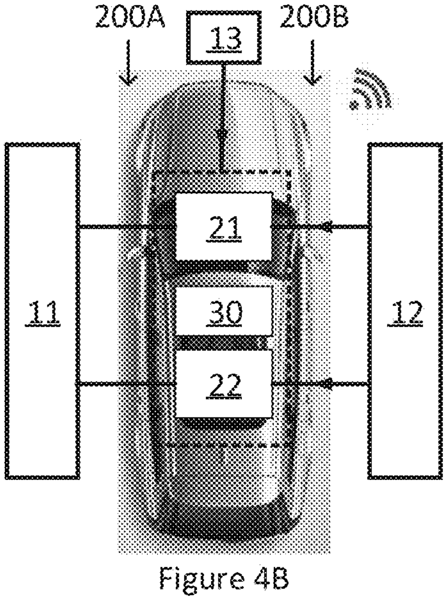

According to an embodiment of the present disclosure, referring to FIG. 4B, when the automated lane keeping system 100 is in the asymmetric mode, the first sensor data from the first environmental sensor 11 is no longer processed by the second processor 22, while the second and third environmental sensors 12 and 13 remain active. Both the first processor 21 and the second processor 22 receive and process second sensor data from the second environmental sensor 12 and third sensor data from the third environmental sensor 13. In an example, the first processor 21 can fuse the second and third sensor data and process the fused result using a first algorithm to obtain a first environmental perception result. Similarly, the second processor 22 can fuse the same sensor data (i.e., the second and third sensor data) and process the fused result using a second algorithm, which differs from the first algorithm, to obtain a second environmental perception result. In other words, in the asymmetric mode, the flow of the second and third sensor data is to both the first processor 21 and the second processor 22.

Additionally, in the asymmetric mode, the control unit 30 can control the communication unit 40 to receive environmental perception information from roadside facilities and/or other vehicles. The control unit 30 can then perform calculations on the received environmental perception information to obtain a third environmental perception result.

In embodiments of the present disclosure, the "environmental perception result" refers to information about the vehicle's driving environment, obtained by computing sensor data collected by the in-vehicle sensors 11-13 or by computing environmental perception information received from roadside facilities and/or other vehicles. The aforementioned information about the vehicle's driving environment can include details of objects within the driving environment, such as identified objects, their respective lanes, and their lateral and longitudinal distances relative to the centerline of the vehicle's current driving lane, among other things.

Thus, in the asymmetric mode, only the sensor data collected from one side of the vehicle body (210) consumes computational resources, as the first sensor data is no longer processed. Consequently, the computational resources originally allocated to process the first sensor data can be reallocated to perform redundant calculations on the second sensor data, thereby achieving redundant sensor data calculations without increasing overall computational resource usage.

In an embodiment, the control unit 30 may be implemented in hardware, software, or a combination of both. The hardware implementation can be realized using one or more of the following: application-specific integrated circuits (ASICs), digital signal processors (DSPs), programmable logic devices (PLDs), field-programmable gate arrays (FPGAs), processors, controllers, microcontrollers, microprocessors, or other electronic units specifically designed to perform their intended functions. The software implementation can be implemented using microcode, program code, or code segments, which may be stored in machine-readable non-transitory storage media, such as memory components.

In an embodiment, the control unit 30 is included within either an electronic control unit (ECU) of the vehicle, a vehicle control unit (VCU), or a domain controller.

Example Methods

An exemplary method will now be described. This method can be performed using the above-mentioned automated lane keeping system 100. Therefore, the previous description of the automated lane keeping system 100 applies to this method. It is noted that the operations involved in the method do not necessarily have to be performed in the exact order described. Instead, multiple operations may be executed in different orders or simultaneously, and some operations may be added or omitted.

Figure 5:
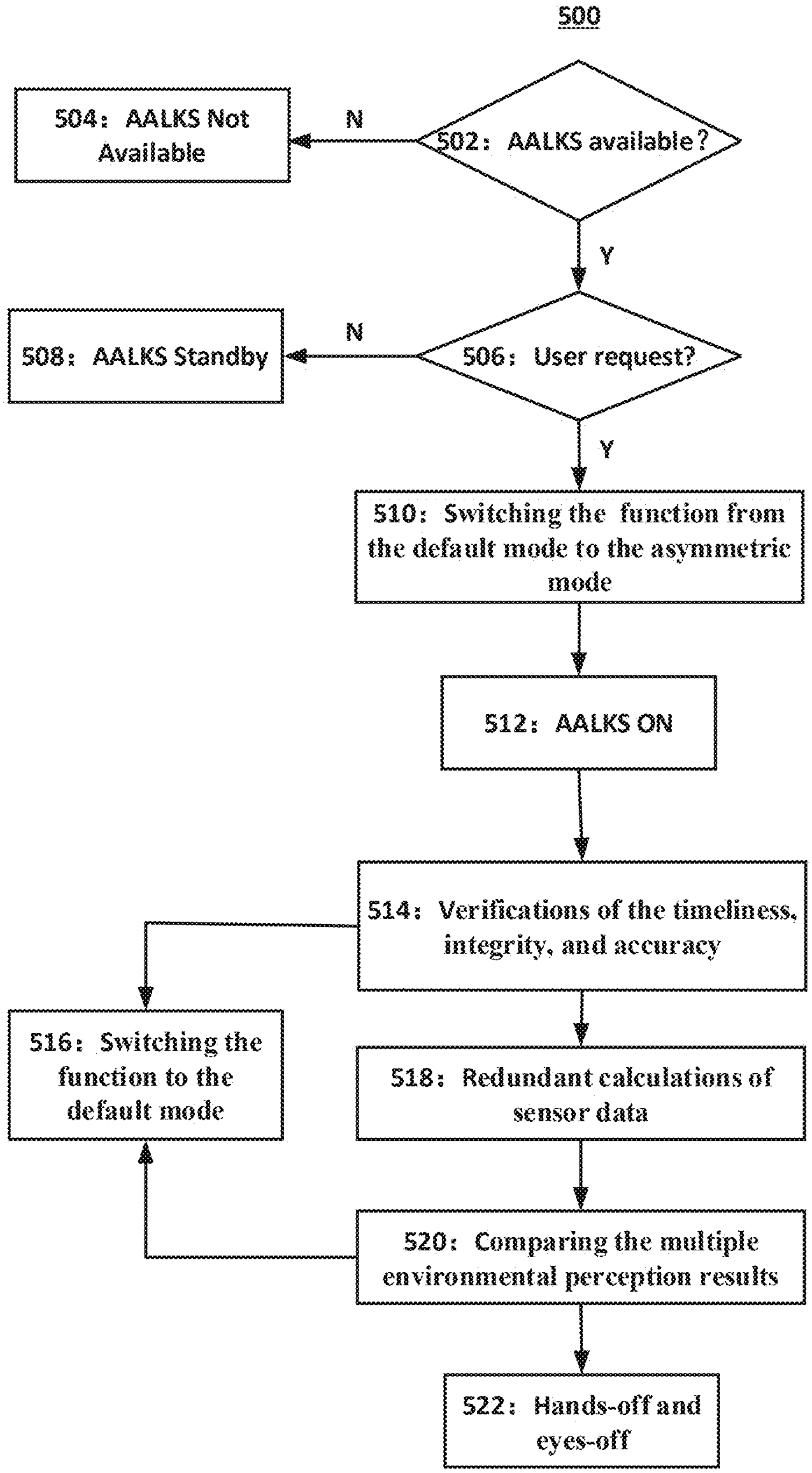
FIG. 5 is a flowchart of an automated lane keeping method according to an embodiment of the present disclosure.

FIG. 5 is a flowchart of an automated lane keeping method 500 according to an embodiment of the present disclosure.

At block 502, the control unit 30 determines whether an availability condition for the asymmetric mode of the automated lane keeping function is met. For instance, an operational design domain (ODD) for the asymmetric mode is predefined based on the availability condition. The control unit 30 then checks whether this predefined ODD is satisfied to determine if the availability condition for the asymmetric mode of the automated lane keeping function is met.

In an embodiment, the availability condition for the asymmetric mode of the automated lane keeping function includes conditions related to the current position of the vehicle, the current lane in which the vehicle is traveling, the lane lines of the current lane, and the perception capabilities of the in-vehicle sensors.

In an embodiment, the availability condition for the asymmetric mode of the automated lane keeping function includes the following conditions. If all of the following conditions are met, the availability condition is determined to be satisfied. Conversely, if at least one condition is not met, the availability condition is determined to be unsatisfied.

1) The current position of the vehicle is within a predetermined area where the asymmetric mode is permitted. This predetermined area could be, for example, a highway or a geofenced zone designated for autonomous driving.

2) The vehicle is traveling in the outermost lane of a multi-lane road. That is to say, the current lane in which the vehicle is travelling is the outermost lane.

3) The lateral distance between the boundary line of the outermost lane (which also serves as the boundary line of the multi-lane road) and the side of the vehicle adjacent to that boundary line is less than a predetermined lateral distance threshold. This predetermined lateral distance threshold is preset to ensure that no other vehicle can cut in from that side of the vehicle. For example, the lateral distance threshold could be a value smaller than the lateral width of a family car, a classification used to describe normally sized cars.

Figure 6A:
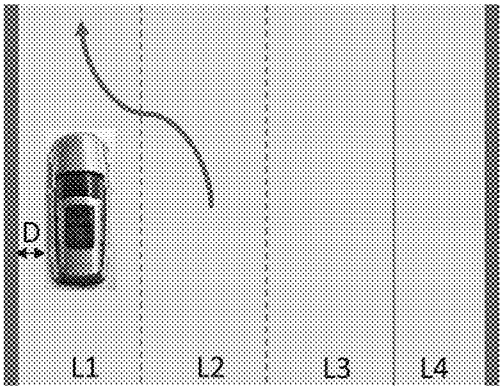
FIGS. 6A and 6B illustrate the availability condition for the asymmetric mode of the automated lane keeping function according to an embodiment of the present disclosure.
Figure 6B:
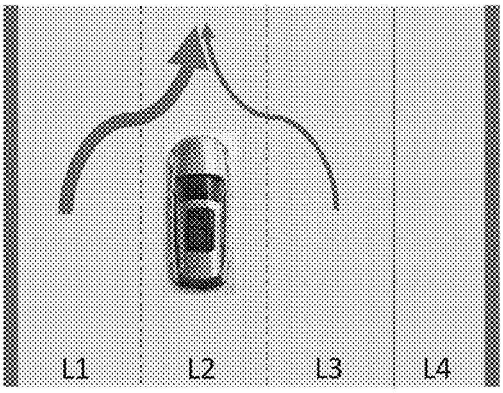

For clarity, with reference to FIGS. 6A and 6B, further explanation is provided for the conditions 2) and 3) described above. As shown in FIG. 6A, the vehicle is traveling in the outermost lane L1 of a multi-lane road that includes lanes L1-L4. The lateral distance D between the boundary line of the outermost lane L1 and the side of the vehicle adjacent to the boundary line is less than the lateral distance threshold. As a result, there is no possibility of vehicles cutting in or overtaking from that side of the vehicle, while there remains a possibility of vehicles cutting in or overtaking from the other side. In contrast, as shown in FIG. 6B, the vehicle is traveling in a non-outermost lane L2 of the multi-lane road. In this case, there is a possibility of vehicles cutting in or overtaking from both sides of the vehicle.

In embodiments of the present disclosure, the side of the vehicle adjacent to the boundary line (for instance, the side where the first environmental sensor 11 is located) is the side proximal to the edge of the multi-lane road. When there is no possibility of vehicles merging into or overtaking from that side, it is deemed safe to omit processing the environmental sensor data from the sensor 11 on that side, as no hazardous objects can approach from that side or the rear, while the forward sensor 13 continues to function. The other side of the vehicle (i.e., the side where the second environmental sensor 12 is located) is the side distant from the edge of the multi-lane road, where the possibility of vehicles merging into or overtaking still exists.

4) The second environmental sensor 12 and/or the third environmental sensor 13 can perceive both lane lines of the current lane within a longitudinal distance threshold ahead of the vehicle. In other words, the visible distance of the second environmental sensor 12 and/or the third environmental sensor 13 exceeds the longitudinal distance threshold.

In an example, the longitudinal distance threshold has a predetermined initial value (e.g., based on test results and/or model calculations) and is stored in the control unit 30. Additionally, the longitudinal distance threshold can be adjusted according to weather conditions. For instance, in rainy or foggy weather, the control unit 30 reduces the longitudinal distance threshold. The control unit 30 can adjust the threshold by applying a preset ratio or by consulting a look-up table. This approach ensures that the availability of the automated lane keeping function is fully optimized and appropriately regulated.

The control unit 30 determines whether all four conditions (1)-(4) are met. If at least one condition is not met, the control unit 30 determines that the availability condition for the asymmetric mode of the automated lane keeping function is not satisfied, and the method 500 proceeds to block 504. If all four conditions are met, the control unit 30 determines that the availability condition for the asymmetric mode of the automated lane keeping function is met, and the method 500 proceeds to block 506.

At block 504, the control unit 30 sends a signal to the HMI 50 indicating that the asymmetric mode of the automated lane keeping function is unavailable. In response to this signal, the HMI 50 displays information on its interface indicating that the asymmetric mode of the automated lane keeping function is unavailable. For example, the HMI 50 may display a message such as "AALKS (Asymmetric Automated Lane Keeping System) Not Available."

At block 506, the control unit 30 determines whether a request signal from the vehicle user to activate the asymmetric mode has been received. For example, the vehicle user may input a request to activate the asymmetric mode of the automated lane keeping function via touch or voice through the HMI 50. The HMI 50 then sends a request signal, which includes the request input by the vehicle user, to the control unit 30. In such a case, the control unit 30 determines that the request signal from the vehicle user to activate the asymmetric mode has been received.

If the control unit 30 determines that the request signal from the vehicle user to activate the asymmetric mode has not been received, the method 500 proceeds to block 508.

At block 508, the asymmetric mode of the automated lane keeping function is set to a standby state. The HMI 50 may display a message indicating that the asymmetric mode is on standby, such as "AALKS Available." In this case, the automated lane keeping function continues to operate in the default mode. This means that while the availability condition for the asymmetric mode of the automated lane keeping function is met, the asymmetric mode is not activated because no user request has been received.

According to embodiments of the present disclosure, the asymmetric mode of the automated lane keeping function is triggered based on a user request and is not automatically activated. If the vehicle user does not request the asymmetric mode, the automated lane keeping function operates in the default mode after activation.

If the control unit 30 determines that the request signal from the vehicle user to activate the asymmetric mode has been received, the method 500 proceeds to block 510.

At block 510, the control unit 30 controls the sensor unit 10 and the processing unit 20 to switch the automated lane keeping function from the default mode to the asymmetric mode. In this case, the automated lane keeping function operates in the asymmetric mode.

With reference to FIGS. 4A and 4B, switching the automated lane keeping function from the default mode to the asymmetric mode involves the steps of 1) disabling the processing of first sensor data, and 2) changing the data transmission flow. Each of these steps is described in detail below.

1) In the step of disabling the processing of first sensor data, the control unit 30 sends an instruction to the second processor 22 to cease processing the first environmental sensor data, while continuing the operation of the second and third environmental sensors 12 and 13. This control strategy is implemented because, in this scenario, risks such as vehicles cutting in or overtaking are only present on the other side (the side where the second environmental sensor 12 is located) and the front of the vehicle body (210), making the processing of the first sensor data unnecessary.

2) In the step of changing data transmission flow, the control unit 30 sends instructions to the sensors 11-13 to change the data transmission flow (i.e., the transmission channel). Initially, the second and third sensor data are transmitted solely to the first processor 21. After the change, the second and third sensor data are transmitted to both the first processor 21 and the second processor 22. In other words, in the asymmetric mode, sensor data from the forward environmental sensor 13 and from the side environmental sensor 12 are transmitted to the first and second processors, respectively.

In an embodiment, after switching to the asymmetric mode, the control unit 30 may also instruct the communication unit 40 to request environmental information from other vehicles and/or roadside facilities (e.g., those within the V2V or V2X communication range). For instance, other vehicles and/or roadside facilities respond to this request by sending the environmental information they have collected to the communication unit 40 of the vehicle (the host vehicle). The communication unit 40 then transmits this environmental information to the control unit 30.

At block 512, the HMI 50 displays information indicating that the asymmetric mode of the automated lane keeping function is active. For example, the HMI 50 may display a message such as "AALKS (Asymmetric Automated Lane keeping System) ON."

At block 514, after the asymmetric mode of the automated lane keeping function is activated, the control unit 30 verifies the timeliness, integrity, and accuracy of the sensor data transmission in the asymmetric mode.

In an embodiment, the control unit 30 verifies the timeliness of sensor data transmission in the asymmetric mode as follows. The control unit 30 determines whether the time interval between the moment the second processor 22 receives the third sensor data (e.g., obtained via the corresponding timestamp) and the moment the first processor 21 receives the third sensor data (e.g., obtained via the corresponding timestamp) is less than a first predetermined time interval. The control unit 30 determines whether the time interval between the moment the first processor 21 receives the second sensor data (e.g., obtained via the corresponding timestamp) and the moment the second processor 22 receives the second sensor data (e.g., obtained via the corresponding timestamp) is less than a second predetermined time interval. If both determinations are affirmative, the control unit 30 determines that the timeliness verification is passed. If at least one determination is negative, the control unit 30 determines that the timeliness verification is failed.

In an embodiment, the control unit 30 verifies the integrity of sensor data transmission in the asymmetric mode as follows. The control unit 30 determines whether the number of data frames received by the first processor 21 within a predetermined duration is equal to the number of data frames received by the second processor 22 within the same duration. If the determination is affirmative, the control unit 30 determines that the integrity verification is passed. If the determination is negative, the control unit 30 determines that the integrity verification fails.

In an embodiment, the control unit 30 verifies the accuracy of sensor data transmission in the asymmetric mode as follows. The control unit 30 determines the consistency between the perception result obtained by the first processor 21 using a first algorithm to process sensor data and the perception result obtained by the second processor 22 using a second algorithm to process sensor data. If the two perception results are consistent or if the difference between them is acceptable (e.g. less than a difference threshold), the control unit 30 determines that the accuracy verification is passed. Conversely, if the two perception results are inconsistent or the difference between them is unacceptable (e.g., equal to or greater than the difference threshold), the control unit 30 determines that the accuracy verification is failed.

In an example, the first processor 21 uses the first algorithm to process sensor data for object detection, while the second processor 22 uses the second algorithm to process sensor data to determine the drivable space (free space) for the vehicle. Both perception results (i.e., detected objects and the determined drivable space) are sent to the control unit 30. The control unit 30 determines whether the perception results are consistent, or the difference is acceptable by checking whether the detected objects are located outside the drivable space. If the checking result indicates that all detected objects are located outside the drivable space, the control unit 30 determines that the perception results are consistent, or the difference is acceptable. If the checking result indicates that at least one detected object is located inside the drivable space, the control unit 30 determines that the two perception results are inconsistent, or the difference is unacceptable.

In another example, a confidence threshold is preset in the control unit 30, representing the level of consistency required between the two perception results. The control unit 30 receives both perception results (i.e., the detected objects and the determined drivable space) and calculates a confidence level based on the extent to which the detected objects fall within the drivable space. For instance, the number of objects entirely within the drivable space is counted as the first quantity, while the number of objects partially within the drivable space is counted as the second quantity. The second quantity is multiplied by a predetermined percentage value (e.g., 0.5), and this product is added to the first quantity to obtain the total number of risky objects that pose potential threats to the vehicle. This total number of risky objects is then divided by the total number of detected objects to obtain a ratio that represents the confidence level. If the confidence level is greater than or equal to the confidence threshold, the control unit 30 determines that the accuracy verification passes. If the confidence level is less than the confidence threshold, the control unit 30 determines that the accuracy verification fails.

It should be noted that various thresholds and predetermined values are involved in the verifications of timeliness, integrity, and accuracy, such as the first predetermined time interval, the second predetermined time interval, the predetermined duration, and the confidence threshold. These thresholds and predetermined values can be established or calibrated based on vehicle test results and stored in the control unit 30. The control unit 30 can adjust one or more of these thresholds and predetermined values, for example, based on specific application scenarios or user requirements, to modify the sensitivity for exiting the asymmetric mode. For instance, the control unit 30 reduces the sensitivity of exiting the asymmetric mode by increasing one or more of these thresholds and predetermined values, thereby extending the availability of the asymmetric mode. Conversely, the control unit 30 increases the sensitivity of exiting the asymmetric mode by decreasing one or more of these thresholds and predetermined values, thereby reducing the availability of the asymmetric mode.

If at least one of the timeliness, integrity, or accuracy verifications fails, the method 500 proceeds to block 516.

At block 516, the control unit 30 switches the automated lane keeping function back to the default mode. Additionally, the HMI 50 displays information indicating that the asymmetric mode of the automated lane keeping function is unavailable. For example, the HMI 50 displays a message such as "AALKS Not Available."

If the verifications of timeliness, integrity, and accuracy are all passed, the automated lane keeping function continues to operate in the asymmetric mode. The method 500 then proceeds to block 518.

At block 518, the control unit 30 instructs the first processor 21 and the second processor 22 to perform redundant calculations on the sensor data, using the same algorithm. For instance, both processors utilize the same algorithm to process sensor data collected by different types of sensors.

In an embodiment, the control unit 30 controls the first processor 21 to fuse camera sensor data (the first modality sensor data in multimodal sensor data) from the second and third sensor data and process the fused result using a predetermined algorithm (e.g., a first predetermined algorithm) to generate the first environmental perception result. The control unit 30 controls the second processor 22 to fuse radar sensor data (the second modality sensor data in multimodal sensor data) from the second and third sensor data and process the fused result using the same predetermined algorithm (i.e., the first predetermined algorithm) to generate the second environmental perception result. This approach enables redundant calculations on sensor data from sensors with different modalities without requiring additional computational resources. It enhances the robustness and accuracy of environmental perception and the subsequent driving decisions based on these perception results. Moreover, this approach meets the redundant calculation requirements for autonomous driving or advanced driver-assistance functions in 'hands-off' and 'eyes-off' scenarios.

In another embodiment, the control unit 30 employs a second predetermined algorithm, which may be the same as or different from the first predetermined algorithm mentioned earlier, to process environmental perception information received from other vehicles and/or roadside facilities to generate a third environmental perception result. This further enhances redundant calculations on sensor data, improving the robustness and accuracy of environmental perception and subsequent driving decisions. Moreover, this approach fulfills the redundant calculation requirements for autonomous driving or advanced driver-assistance functions in "hands-off" and "eyes-off" scenarios.

At block 520, the control unit 30 compares the multiple environmental perception results obtained to determine one or more matching degrees between these results. Subsequently, the control unit 30 compares each matching degree with a matching degree threshold. By comparing a matching degree with the matching degree threshold, the control unit 30 evaluates the environmental perception capability in the asymmetric mode. This enables timely detection of insufficient perception capability of vehicle (e.g., the sensors 11-13) and allows the automated lane keeping function to exit the asymmetric mode once such a situation is identified.

In an embodiment, the control unit 30 compares the first environmental perception result with the second environmental perception result to obtain a first matching degree. If the first matching degree is greater than the matching degree threshold, the method 500 proceeds to block 522. At block 522, the asymmetric mode is maintained, and the HMI 50 displays a message indicating that the vehicle user can enter a "hands-off" and "eyes-off" driving state. Conversely, if the first matching degree is less than or equal to the matching degree threshold, the method 500 proceeds to block 516, where the automated lane keeping function reverts to the default mode.

In another embodiment, the control unit 30 performs the following comparisons. The control unit 30 compares the first environmental perception result with the second environmental perception result to obtain a first matching degree, compares the third environmental perception result with the first environmental perception result to obtain a second matching degree, and compares the third environmental perception result with the second environmental perception result to obtain a third matching degree. If each of the three matching degrees is greater than the matching degree threshold, the method 500 proceeds to block 522, where the asymmetric mode is maintained. Conversely, if at least one of the three matching degrees is less than or equal to the matching degree threshold, the method 500 proceeds to block 516, where the automated lane keeping function reverts to the default mode.

It should be noted that the matching degree threshold is predetermined based on vehicle test results and/or model calculations and is stored in control unit 30. The matching degree threshold can be adjusted according to specific application scenarios. For example, the control unit 30 increases the matching degree threshold in scenarios where lane markings are unclear or have been repainted (e.g., in construction zones) or where the sensor perception distance is affected (e.g., in rain, snow, or during nighttime conditions).

The above describes some situations in which the asymmetric mode is switched back to the default mode. According to some embodiments of the present disclosure, there are also scenarios where the asymmetric mode is exited. For example, an exit condition for exiting the asymmetric mode is preset in the control unit 30. After the automated lane keeping function is operated in the asymmetric mode, the control unit 30 monitors in real time whether the exit condition is met. Once the exit condition is met, the control unit 30 controls the HMI 50 to provide a message reminding the driver to take over the vehicle.

In an embodiment, the exit condition includes the following multiple conditions. When at least one of these conditions is met, the control unit 30 determines that the exit condition is met and controls the automated lane keeping function to exit the asymmetric mode. Additionally, the control unit 30 instructs the HMI 50 to provide a message reminding the driver to take over the vehicle. For instance, the HMI 50 notifies the driver through voice announcements or by displaying corresponding text or symbol information on an interface. If the driver takes over the vehicle, the control unit 30 activates the first environmental sensor 11 and switches the data transmission channel to align with the default mode. If the driver fails to take over the vehicle, for example, due to distraction or ignoring the notification, the control unit 30 controls the vehicle to brake and come to a stop within the current lane or executes a Minimal Risk Maneuver (MRM) strategy.

Below, each of the multiple conditions 1)-5) is described. Conditions 1)-4) can be regarded as the opposite of the corresponding conditions for entering the asymmetric mode, as described above.

1) The current position of the vehicle is not within a predetermined area where the asymmetric mode is permitted. For example, the vehicle was previously within that area but has since exited that area.

2) The vehicle has exited the outermost lane of a multi-lane road. For instance, the vehicle has performed a lane change based on route planning.

3) The lateral distance between the boundary line of the outermost lane (which also serves as the boundary line of the multi-lane road) and the side of the vehicle adjacent to that boundary line is greater than or equal to the predetermined lateral distance threshold. For example, the lateral distance gradually increases during driving until it exceeds the threshold.

4) The second and/or third environmental sensors are unable to detect the lane markings on either side of the vehicle within the longitudinal distance threshold. For example, the lane markings may be unclear, or the second and/or third environmental sensors may have malfunctioned.

5) An obstacle appears in front of the vehicle, thus requiring a lane change. For example, construction workers or roadblocks may appear ahead, necessitating a lane change.

An embodiment of the disclosure provides a vehicle including the automated lane keeping system 100 as described above.

An embodiment of the disclosure provides a non-transitory computer-readable medium with instructions stored therein which, when executed, causes a processor to carry out the steps of the method 500 described above.

An embodiment of the disclosure provides a computer program product including computer-executable instructions that, when executed, cause one or more processors to perform the method 500 described above.

It is noted that all the operations in the method described above are merely exemplary, and the disclosure is not limited to any operations in the method or sequence orders of these operations and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), a state machine, a gate logic, a discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk.

Although a memory is shown as being separated from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the present disclosure, which are known or to be apparent to those skilled in the art, are intended to be covered by the claims.

What is claimed is:

1. An automated lane keeping system for a vehicle, comprising:

a sensor unit comprising first, second, and third environmental sensors, the first environmental sensor being arranged on one side of a vehicle body of the vehicle and configured to obtain an image of or detect a boundary line or an object in a surrounding environment of said one side of the vehicle body and output first sensor data related to the boundary line or object, the second environmental sensor being arranged on the other side of the vehicle body and configured to obtain an image of or detect a boundary line or an object in a surrounding environment of the other side of the vehicle body and output second sensor data related to the boundary line or object, the third environmental sensor being arranged at the front of the vehicle body and configured to obtain an image of or detect a boundary line or an object in a surrounding environment in front of the vehicle body and output third sensor data related to the boundary line or object;

a processing unit comprising first and second processors each of which is electrically connected to the first to third environmental sensors via a wire, the processing unit configured to form perception results related to the boundary lines or objects from the first sensor data, the second sensor data, and the third sensor data; and a control unit communicatively connected to the sensor unit and the processing unit, and configured to:

determine whether an availability condition for an asymmetric mode of an automated lane keeping function is met;

if it is determined that the availability condition for the asymmetric mode is met, control the sensor unit and the processing unit to switch the automated lane keeping function to the asymmetric mode from a default mode, wherein, in the default mode, the second processor receives and processes the first sensor data, while the first processor receives and processes the second and third sensor data; in the asymmetric mode, the first and second processors receive and process the second and third sensor data.

2. The automated lane keeping system of claim 1, wherein the control unit is further configured to:

verify the timeliness and integrity of data transmission and the accuracy of the perception results in the asymmetric mode;

if all the verifications of timeliness, integrity, and accuracy pass, maintain the asymmetric mode; and if at least one of the verifications of timeliness, integrity, and accuracy fails, control the sensor unit and the processing unit to switch the automated lane keeping function to the default mode.

3. The automated lane keeping system of claim 2, wherein verifying the timeliness of data transmission comprises:

determining whether a first time interval is less than a first predetermined time interval, the first time interval being between the moment the second processor receives the third sensor data and the moment the first processor receives the third sensor data;

determining whether a second time interval is less than a second predetermined time interval, the second time interval being between the moment the first processor receives the second sensor data and the moment the second processor receives the second sensor data;

judging that the timeliness verification passes if both determinations are affirmative; and judging that the timeliness verification fails if at least one determination is negative.

4. The automated lane keeping system of claim 2, wherein verifying the integrity of data transmission comprises:

determining whether the number of data frames received by the first processor within a predetermined duration is equal to the number of data frames received by the second processor within the same predetermined duration;

judging that the integrity verification passes if the determination is affirmative; and judging that the integrity verification fails if the determination is negative.

5. The automated lane keeping system of claim 2, wherein verifying the accuracy of perception results comprises:

determining consistency between a first perception result obtained by the first processor processing sensor data using a first algorithm and a second perception result obtained by the second processor processing sensor data using a second algorithm, wherein the second algorithm is different from the first algorithm;

judging that the accuracy verification passes if the first and second perception results are consistent; and judging that the accuracy verification fails if the first and second perception results are inconsistent.

6. The automated lane keeping system of claim 2, wherein verifying the accuracy of perception results comprises:

obtaining a perception result of detected objects generated by the first processor, which processes the second and third sensor data using a first algorithm, and another perception result of a drivable space generated by the second processor, which processes the second and third sensor data using a second algorithm;

determining whether the two perception results are consistent by checking whether the detected objects are located outside the drivable space;

if the checking result indicates that all detected objects are located outside the drivable space, determining that the two perception results are consistent, and that the accuracy verification passes; and if the checking result indicates that at least one detected object is located inside the drivable space, determining that the two perception results are inconsistent, and that the accuracy verification fails.

7. The automated lane keeping system of claim 2, wherein verifying the accuracy of perception results comprises:

obtaining a perception result of detected objects generated by the first processor, which processes the second and third sensor data using a first algorithm, and another perception result of a drivable space generated by the second processor, which processes the second and third sensor data using a second algorithm;

calculating a confidence level based on the extent to which the detected objects fall within the drivable space;

if the confidence level is greater than or equal to a confidence threshold, determining that the accuracy verification passes; and if the confidence level is less than the confidence threshold, determining that the accuracy verification fails.

8. The automated lane keeping system of claim 1, wherein the control unit is configured to, in the asymmetric mode:

control the first processor to process the second and third sensor data using a first predetermined algorithm to generate a first environmental perception result;

control the second processor to process the second and third sensor data using the first predetermined algorithm to generate a second environmental perception result;

compare the first environmental perception result with the second environmental perception result to obtain a first matching degree;

maintain the automated lane keeping function in the asymmetric mode if the first matching degree is greater than a matching degree threshold; and control the automated lane keeping function to return to the default mode if the first matching degree is equal to or less than the matching degree threshold.

9. The automated lane keeping system of claim 1, wherein the control unit is configured to, in asymmetric mode:

control the first processor to process the second and third sensor data using a first predetermined algorithm to generate a first environmental perception result;

control the second processor to process the second and third sensor data using the first predetermined algorithm to generate a second environmental perception result;

compare the first environmental perception result with the second environmental perception result to obtain a first matching degree;

request environmental information sensed by other vehicles and/or roadside facilities;

process the environmental information using a second predetermined algorithm to generate a third environmental perception result;

compare the third environmental perception result with the first environmental perception result to obtain a second matching degree;

compare the third environmental perception result with the second environmental perception result to obtain a third matching degree;

maintain the automated lane keeping function in the asymmetric mode if each of the first, second, and third matching degrees is greater than the matching degree threshold; and control the automated lane keeping function to return to the default mode if at least one of the first, second, and third matching degrees is equal to or less than the matching degree threshold.

10. The automated lane keeping system of claim 8, wherein the control unit is configured to, in asymmetric mode:

control the first processor to process a first modality sensor data in the second and third sensor data using the first predetermined algorithm to generate the first environmental perception result; and control the second processor to process a second modality sensor data in the second and third sensor data using the first predetermined algorithm to generate the second environmental perception result.

11. The automated lane keeping system of claim 8, wherein the control unit is configured to:

increase the matching degree threshold in scenarios where lane markings are unclear or have been repainted or where the sensor perception distance is affected.

12. The automated lane keeping system of claim 1, wherein determining whether the availability condition is met comprises:

determining whether the current vehicle position, the current lane in which the vehicle is traveling, and the capabilities of the second and third sensors to perceive lane lines of the current lane all met corresponding preset conditions.

13. The automated lane keeping system of claim 1, wherein determining whether the availability condition is met comprises determining whether each of the following conditions is met:

the current vehicle position is within a predetermined area where the asymmetric mode is permitted;

the current lane where the vehicle is traveling is the outermost lane of a multi-lane road;

the lateral distance between a boundary line of the outermost lane and one side of the vehicle adjacent to that boundary line is less than a predetermined lateral distance threshold; and both lane lines of the current lane within a longitudinal distance threshold ahead of the vehicle are clearly identifiable by the second and/or third environmental sensors.

14. The automated lane keeping system of claim 1, comprising a human-machine interface (HMI) configured to provide a message indicating the availability status of the asymmetric mode.

15. The automated lane keeping system of claim 1, wherein the first processor and the second processor are deployed on separate in-vehicle chips; or the first processor and the second processor are deployed on different cores of a multi-core processor of a single in-vehicle chip.

16. The automated lane keeping system of claim 1, wherein the asymmetric mode is triggered by a request from a user of the vehicle to activate the asymmetric mode.

17. A vehicle comprising the automated lane keeping system of claim 1.

18. An automated lane keeping method for a vehicle, the vehicle comprising:

a sensor unit comprising first, second, and third environmental sensors, the first environmental sensor being arranged on one side of a vehicle body of the vehicle and configured to obtain an image of or detect a boundary line or an object in a surrounding environment of said one side of the vehicle body and output first sensor data related to the boundary line or object, the second environmental sensor being arranged on the other side of the vehicle body and configured to obtain an image of or detect a boundary line or an object in a surrounding environment of the other side of the vehicle body and output second sensor data related to the boundary line or object, the third environmental sensor being arranged at the front of the vehicle body and configured to obtain an image of or detect a boundary line or an object in a surrounding environment in front of the vehicle body and output third sensor data related to the boundary line or object; and a processing unit comprising first and second processors each of which is electrically connected to the first to third environmental sensors via a wire, the processing unit configured to form perception results related to the boundary lines or objects from the first sensor data, the second sensor data, and the third sensor data;

the automated lane keeping method, by a control unit, comprising the step of:

determining whether an availability condition for an asymmetric mode of an automated lane keeping function is met; and if it is determined that the availability condition for the asymmetric mode is met, control the sensor unit and the processing unit to switch the automated lane keeping function to the asymmetric mode from a default mode, wherein, in the default mode, the second processor receives and processes the first sensor data, while the first processor receives and processes the second and third sensor data; in the asymmetric mode, the first and second processors receive and process the second and third sensor data.

19. The automated lane keeping method of claim 18, further comprising:

in the asymmetric mode, verifying the timeliness and integrity of data transmission and the accuracy of the perception results;

if all the verifications of timeliness, integrity, and accuracy pass, maintaining the asymmetric mode; and if at least one of the verifications of timeliness, integrity, and accuracy fails, controlling the sensor unit and the processing unit to switch the automated lane keeping function to the default mode.

20. The automated lane keeping method of claim 18, wherein determining whether the availability condition is met comprises:

determining whether the current vehicle position, the current lane in which the vehicle is traveling, and the capabilities of the second and third sensors to perceive lane lines of the current lane all met corresponding preset conditions.

* * * * *